United States Patent
England

(12) 
(10) Patent No.: US 8,272,350 B1
(45) Date of Patent: Sep. 25, 2012

(54) RECEPTACLE ASSEMBLY

(76) Inventor: David P. England, Phoenix, AZ (US)

( * ) Notice: Subject to any disclaimer, the term of this patent is extended or adjusted under 35 U.S.C. 154(b) by 227 days.

(21) Appl. No.: 12/780,147

(22) Filed: May 14, 2010

Related U.S. Application Data

(60) Provisional application No. 61/216,171, filed on May 14, 2009.

(51) Int. Cl.
*A01K 39/00* (2006.01)

(52) U.S. Cl. .................... 119/52.1; 222/485

(58) Field of Classification Search .............. 119/56.1, 119/52.1, 51.01; 222/485, 330, 185.1, 181.1
See application file for complete search history.

(56) References Cited

U.S. PATENT DOCUMENTS

| | | | | |
|---|---|---|---|---|
| 56,557 | A | * | 7/1866 | Hayden .................. 119/56.1 |
| 903,309 | A | * | 11/1908 | Ottinger .................. 119/52.1 |
| 993,630 | A | * | 5/1911 | Worsham ................ 119/51.5 |
| 1,005,071 | A | * | 10/1911 | Randall .................. 119/52.1 |
| 1,120,178 | A | * | 12/1914 | Berghofer ............... 119/51.01 |
| 1,640,583 | A | | 8/1927 | Steinruck |
| D142,793 | S | * | 11/1945 | Running ................. D30/131 |
| 2,537,494 | A | * | 1/1951 | Venske et al. ........... 119/56.1 |
| 2,808,029 | A | | 10/1956 | Geerlings |
| 3,742,913 | A | | 7/1973 | Crippen |
| 3,826,231 | A | | 7/1974 | Crawford et al. |
| 4,248,175 | A | | 2/1981 | Navarro |
| 4,450,790 | A | | 5/1984 | Stansbury, Jr. |
| 4,640,229 | A | | 2/1987 | Swartzendruber et al. |
| 4,800,844 | A | | 1/1989 | Van Gilst |
| 4,823,738 | A | | 4/1989 | Gold |
| 5,546,894 | A | | 8/1996 | St-Pierre |
| 5,699,753 | A | * | 12/1997 | Aldridge, III ............... 119/52.1 |
| 5,884,582 | A | | 3/1999 | Duckworth |
| 6,142,099 | A | | 11/2000 | Lange, Jr. |
| 6,371,047 | B1 | | 4/2002 | van den Berg |
| 6,477,981 | B1 | | 11/2002 | Harper |
| 6,701,866 | B1 | | 3/2004 | Shieh |
| 7,040,249 | B1 | | 5/2006 | Mushen |
| D540,492 | S | | 4/2007 | Gorr |

* cited by examiner

*Primary Examiner* — Kristen C Hayes
(74) *Attorney, Agent, or Firm* — Parsons & Goltry; Michael W. Goltry; Robert A. Parsons

(57) ABSTRACT

A receptacle assembly includes a receptacle formed by a continuous sidewall extending between a bottom and an opposed top. A diverter, formed with inclined channels, is positioned in the bottom of the receptacle opposite to the top. A volume is defined by the continuous sidewall between the inclined channels of the diverter and the top, an opening is formed in the continuous sidewall opposite to each of the inclined channels, and the inclined channels of the diverter are for receiving and conveying material from the volume to the respective openings.

14 Claims, 12 Drawing Sheets

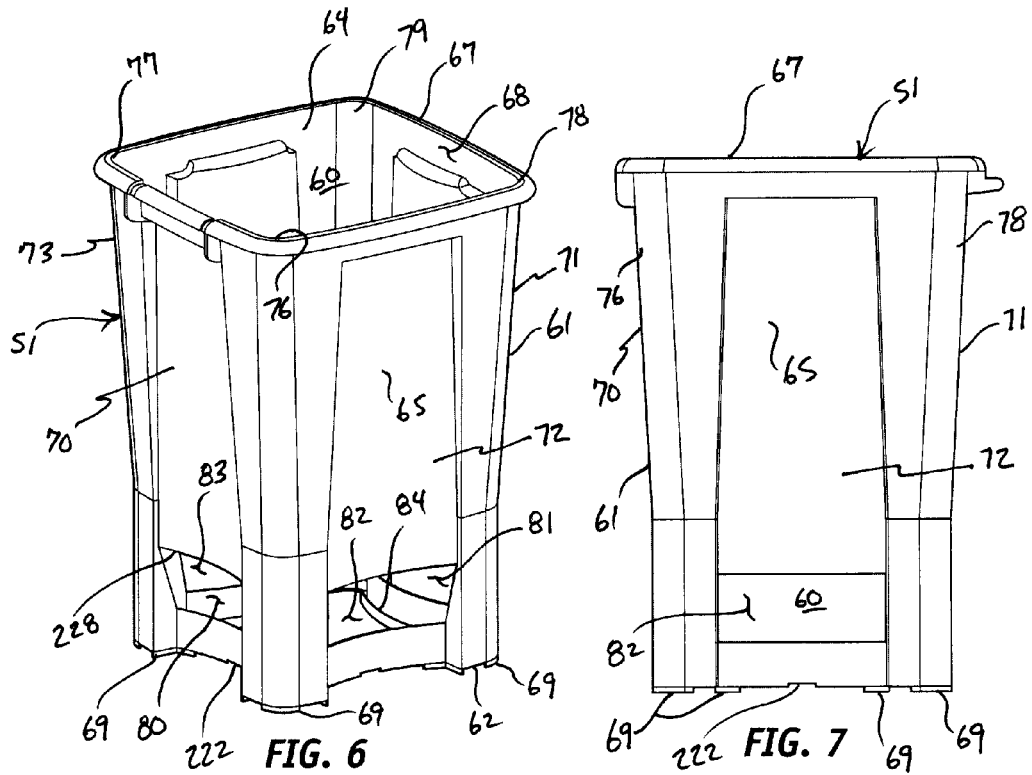
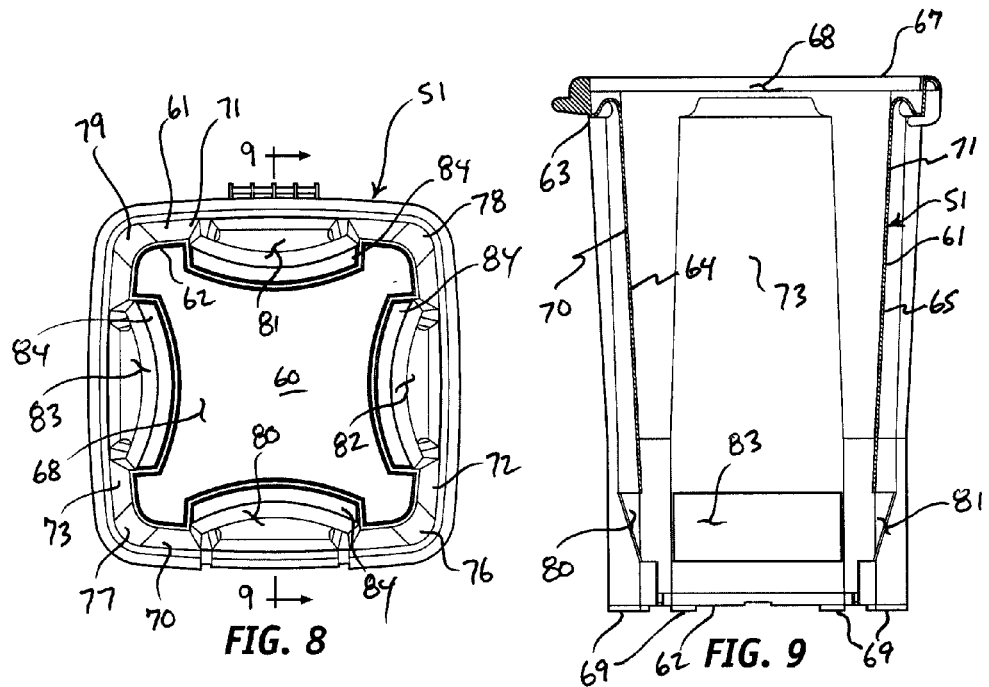

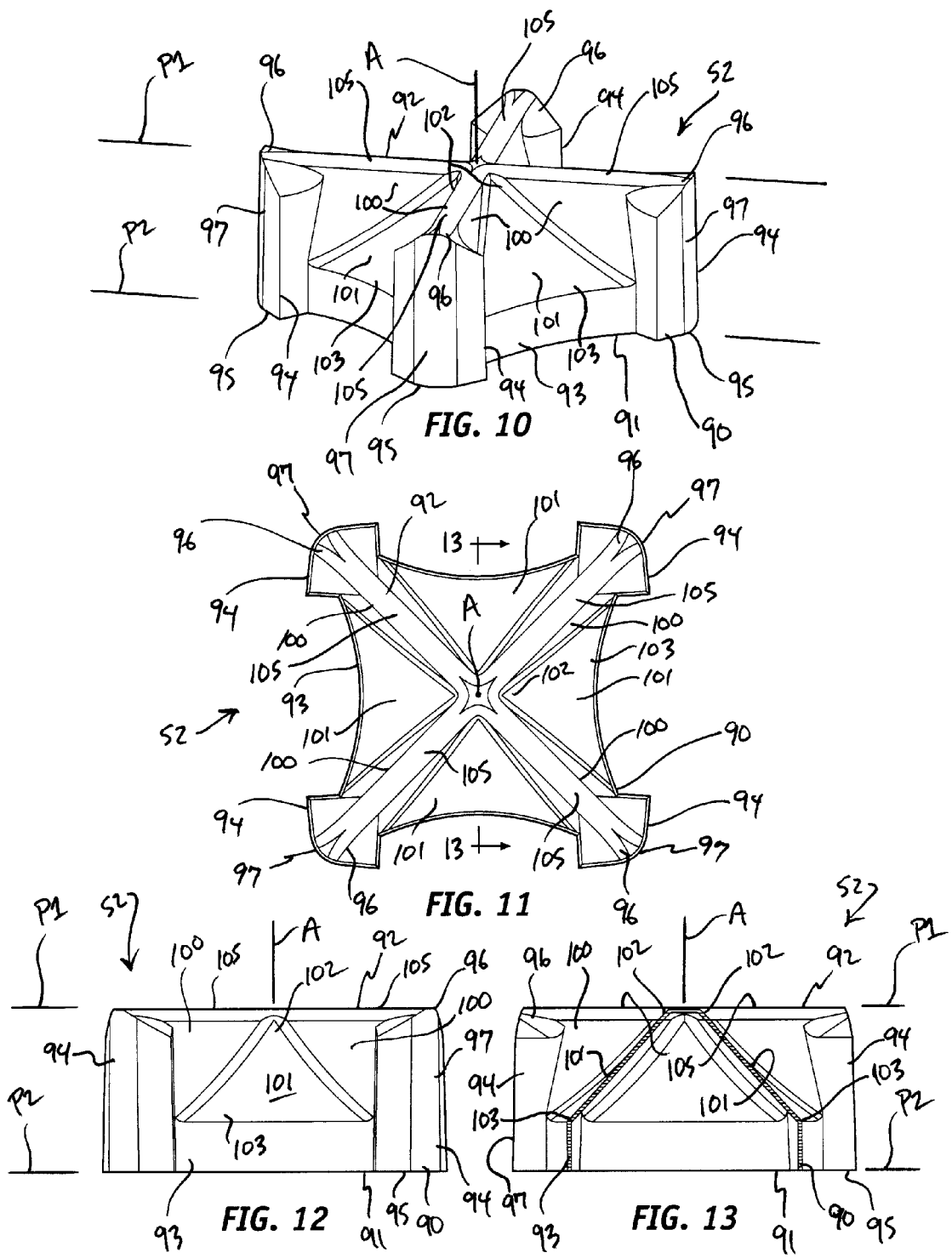

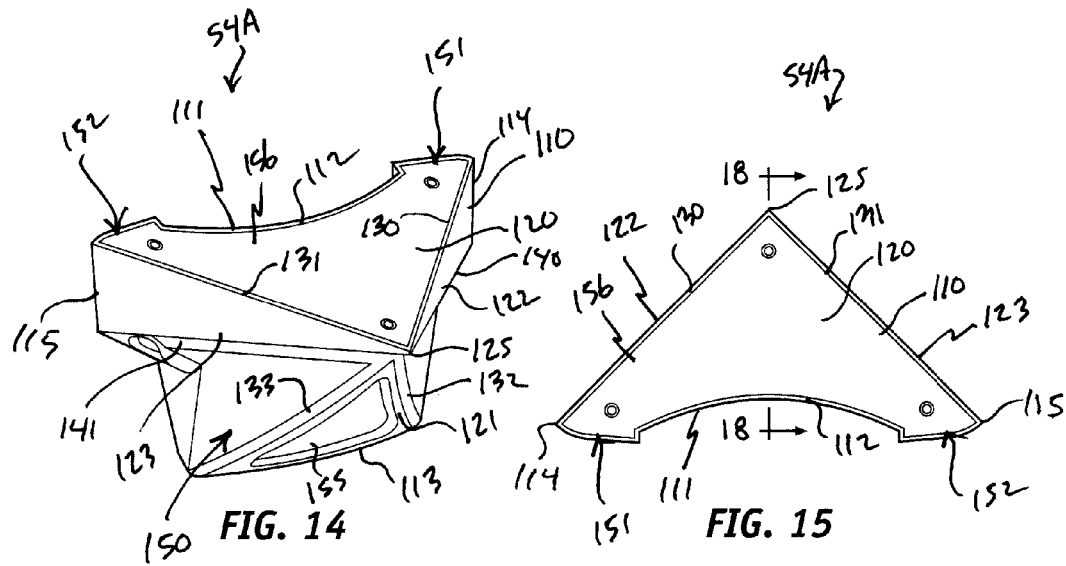
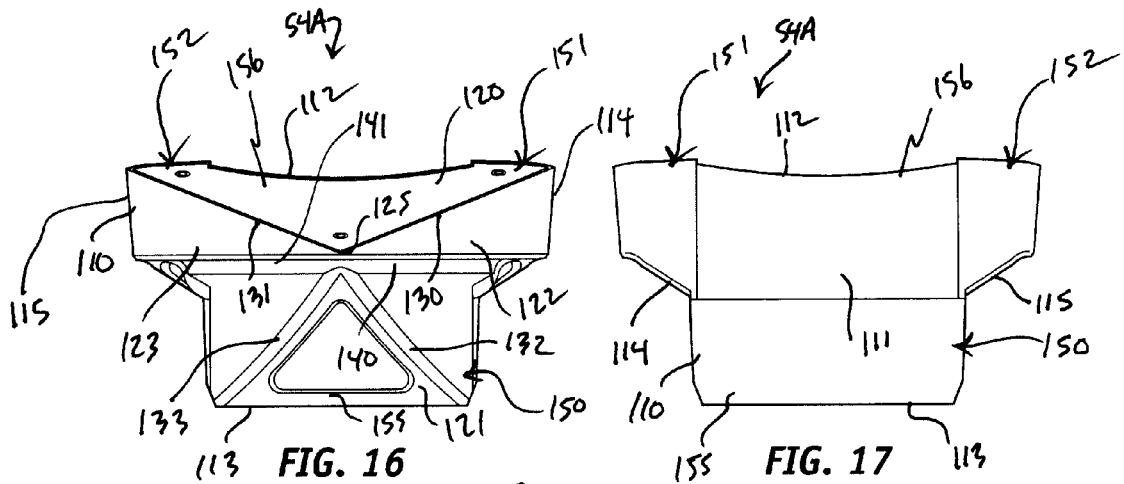
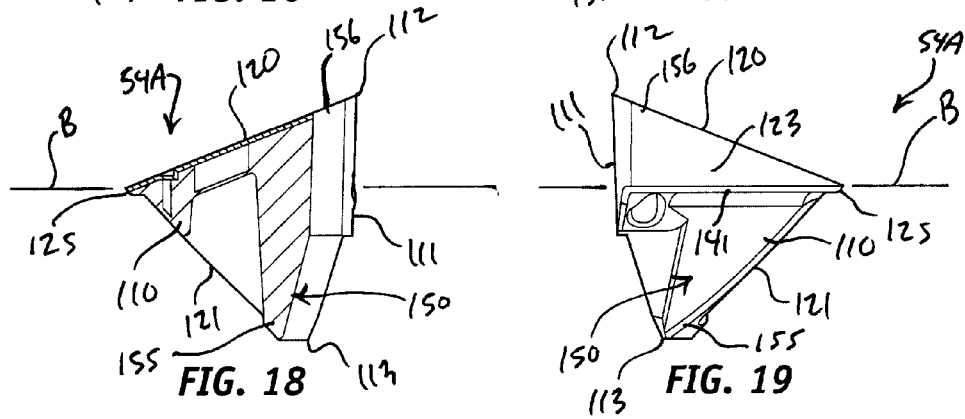

US 8,272,350 B1

RECEPTACLE ASSEMBLY

CROSS-REFERENCE TO RELATED APPLICATION

This application claims the benefit of U.S. Provisional Patent Application Ser. No. 61/216,171, filed May 14, 2009.

FIELD OF THE INVENTION

The present invention relates to receptacle assemblies designed to receive and store pet food, and to apply the pet food to bowls for feeding domestic pets.

BACKGROUND OF THE INVENTION

A typical gravity pet feeder consists of pet food storage container that gravity feeds pet food to an attached bowl. Pet food is conveyed to the bowl by gravity, and is continuously replenished as a pet consumes the food from the bowl. The gravity pet feeder is desirable as it provides a pet with a continuous, reliable source of food, and eliminates the need for a pet owner to repeatedly fill the bowl when the bowl is empty or at designated feeding times. Although some gravity pet feeders incorporate one bowl, some incorporate a plurality of bowls.

The innovation of the gravity pet feeder represented an important development in pet feeding technology as it was intended to make feeding pets much easier and convenient. However, existing gravity pet feeders are overly simplistic and fail to manage the pet food between the storage container and the associated bowl(s), are unwieldly and difficult to use, are not easy to clean, are easily broken and expensive to replace, and in gravity pet feeders that incorporate a plurality of bowls fail to provide a way to manage the pet food between the corresponding bowls. Given these and other deficiencies in the art, the need for continued improvement is evident.

SUMMARY OF THE INVENTION

According to the principle of the invention, a receptacle assembly includes a receptacle including a volume defined by a continuous sidewall extending between a bottom and an opposed top, openings formed in the continuous sidewall proximate to the bottom communicating with the volume, and inclined channels removably positioned in the volume of the receptacle proximate to the bottom for receiving and conveying material from the volume to the respective openings. A plug is located in the volume and is applied to a first one of the inclined channels isolating from the volume a first one of the openings relating to the first one of the inclined channels. The plug is formed with an inclined surface for receiving and conveying material from the volume to a second one of the inclined channels adjacent to the first one of the inclined channels. The receptacle assembly further includes bowls, which are engagable to the receptacle in communication with one of the openings formed in the continuous sidewall. The top is an open top, and a lid is mounted to the receptacle between a first position away from the open top opening the open top, and a second position toward and against the open top closing the open top.

According to the principle of the invention, a receptacle assembly includes a receptacle including a continuous sidewall extending between a bottom and an opposed top. A diverter is formed with inclined channels, and is removably positioned in the bottom of the receptacle opposite to the top. A volume is defined by the continuous sidewall between the inclined channels of the diverter and the top. An opening is formed in the continuous sidewall opposite to each of the inclined channels. The inclined channels of the diverter are for receiving and conveying material from the volume to the respective openings. The diverter includes a perimeter confronting the continuous sidewall. There is an engagement pair formed between the continuous sidewall and the perimeter of the diverter preventing the inclined channels of the diverter from laterally displacing with respect to the openings formed in the receptacle. The engagement pair includes an element carried by one of the receptacle and the perimeter of the diverter, and a complemental element carried by the other of the receptacle and the perimeter of the diverter. The element of the engagement pair is a tongue, and the complemental element is a groove. The tongue is exemplary of a male engagement element, and the groove is exemplary of a corresponding female engagement element. A plug is located in the volume and is applied to a first one of the inclined channels of the diverter isolating from the volume the first one of the inclined channels and a first one of the openings relating to the first one of the inclined channels. The plug is formed with an inclined surface for receiving and conveying material from the volume to a second one of the inclined channels adjacent to the first one of the inclined channels. The plug is received in, and relates to, the first one of the inclined channels. The receptacle assembly further includes bowls each engagable to the receptacle in communication with one of the openings formed in the continuous sidewall. The top includes a rim encircling a main opening into the volume at the top of the receptacle, and a lid mounted to the receptacle between a first position away from the rim exposing the main opening to the volume, and a second position toward and against the rim closing the main opening to the volume.

According to the principle of the invention, a receptacle assembly includes a receptacle including continuous sidewall extending between a bottom and an opposed top. The continuous sidewall has an inner surface and an opposed outer surface. Bowls are coupled directly to the receptacle proximate to the bottom, and the bowls project outward from the outer surface of the continuous sidewall. An integral diverter, formed with inclined channels, is removably positioned in the bottom of the receptacle opposite to the top. A volume is defined by the inner surface of the continuous sidewall between the inclined channels of the diverter and the top. An opening is formed in the continuous sidewall between each of the inclined channels and one of the bowls, and the inclined channels of the diverter are for receiving and conveying material from the volume to the bowls through the respective openings. The diverter includes a perimeter confronting the continuous sidewall. A plurality of engagement pairs are formed between the continuous sidewall and the perimeter of the diverter preventing the inclined channels of the diverter from laterally displacing with respect to the openings formed in the receptacle. The engagement pairs each include an element carried by one of the receptacle and the perimeter of the diverter, and a complemental element carried by the other of the receptacle and the perimeter of the diverter. The element of the engagement pair is a tongue, and the complemental element is a groove. The tongue is exemplary of a male engagement element, and the groove is exemplary of a corresponding female engagement element. A plug is applied to a first one of the inclined channels of the diverter isolating from the volume the first one of the inclined channels and a first one of the openings relating to the first one of the inclined channels. The plug is formed with an inclined surface for receiving and conveying material from the volume to a second one of the inclined channels adjacent to the first one of the inclined channels. The plug is received in, and relates to, the first one of the inclined channels. A rim is formed in the top of the receptacle, which encircles a main opening into the volume at the top of the receptacle. A lid is mounted to the receptacle between a first position away from the rim exposing the main opening to the volume, and a second position toward and against the rim closing the main opening to the volume.

BRIEF DESCRIPTION OF THE DRAWINGS

Referring to the drawings:

FIG. 6 is a perspective view of the receptacle of FIG. 1;
FIG. 7 is a side elevation view of the receptacle of FIG. 1;
FIG. 8 is a top plan view of the receptacle of FIG. 1;
FIG. 9 is a section view taken along line 9-9 of FIG. 8;
FIG. 10 is a perspective view of the diverter of FIG. 1;
FIG. 11 is a top plan view of the diverter of FIG. 1;
FIG. 12 is a side elevation view of the diverter of FIG. 1;
FIG. 13 is a section view taken alone line 13-13 of FIG. 11;
FIG. 14 is a perspective view one of the plugs of the receptacle assembly illustrated in FIG. 1;
FIG. 15 is a top plan view of the plug of FIG. 14;
FIG. 16 is a rear elevation view of the plug of FIG. 14;
FIG. 17 is a front elevation view of the plug of FIG. 14;
FIG. 18 is a section view taken along line 18-18 of FIG. 15;
FIG. 19 is a side elevation view of the plug of FIG. 14.

DETAILED DESCRIPTION

Figure 1:
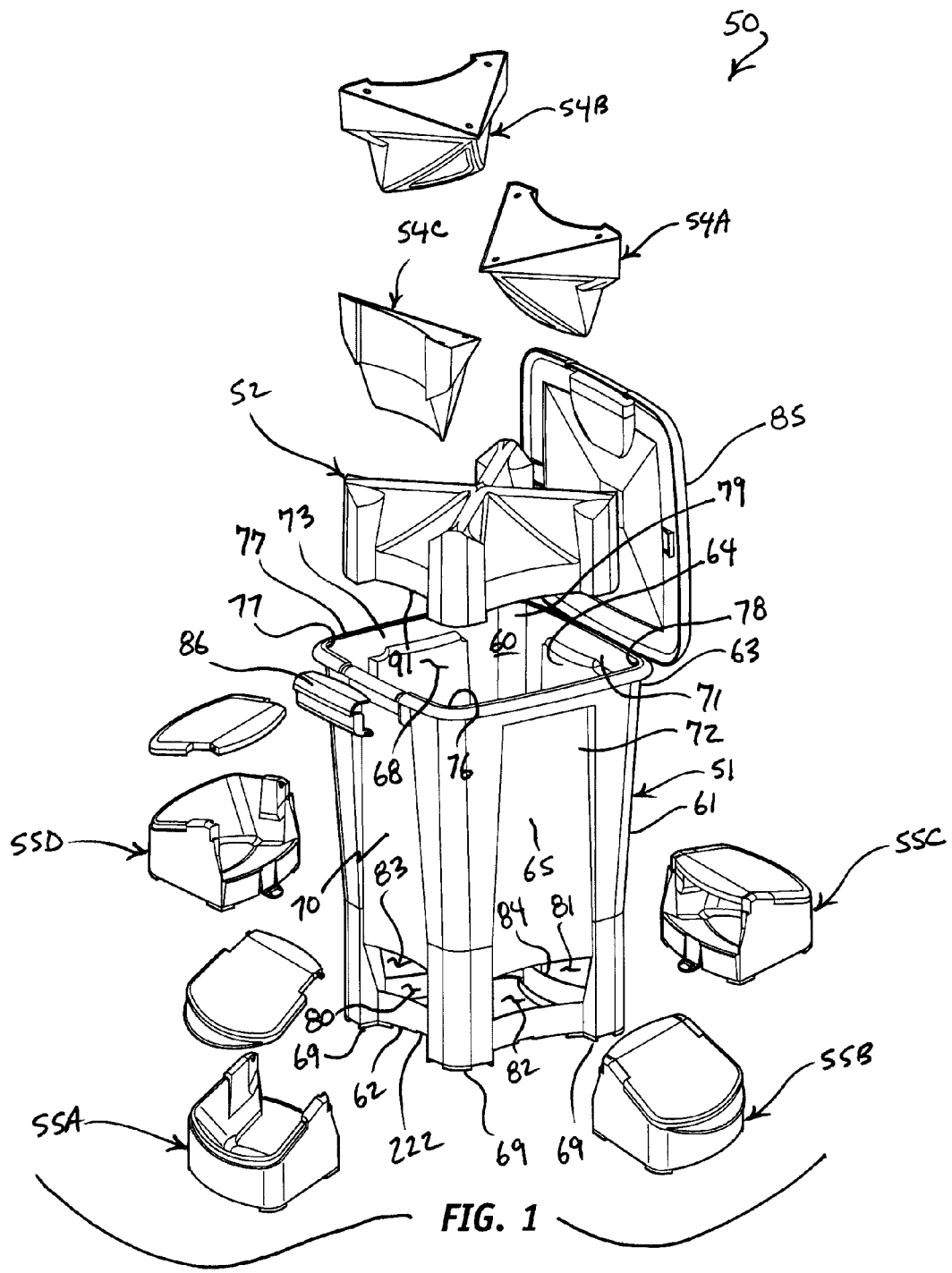
FIG. 1 is an exploded perspective view of a receptacle assembly constructed and arranged in accordance with the principle of the invention, the receptacle assembly including a receptacle, a diverter positionable in the receptacle, a plurality of bowls engagable to the receptacle, and a plurality of plugs configured to be installed between the diverter and the receptacle.

Turning now to the drawings, in which like reference characters indicate corresponding elements throughout the several views, attention is first directed to FIG. 1 in which there is an exploded perspective view of a receptacle assembly 50 constructed and arranged in accordance with the principle of the invention including a receptacle 51, a diverter 52 removably positionable in receptacle 51, plugs 54A, 54B, and 54C, and bowls 55A, 55B, 55C, and 55D, which are configured to be removably coupled to receptacle 51. Receptacle assembly 50 is exemplary of a pet food dispenser. Bowls 55A-55D are engagable directly to receptacle 51 in a radial pattern around the bottom of receptacle 51. Diverter 52 is structured to be removably positioned in the bottom of receptacle 51 opposite to the top of receptacle 51. The diverter 52 is structured to receive pet food placed in receptacle 51 and convey the pet food by gravity to the corresponding bowls 55A-55D. Diverter 52 is easily installed with respect to receptacle 51, and is easily removed from receptacle 51 for cleaning, maintenance, or replacement. Receptacle assembly includes four bowls 55A-55D in the present embodiment. To block pet food from passing to a selected bowl that is not in use, one of plugs 54A-54C may be applied to diverter 52 between diverter 52 and receptacle 51 to isolate the corresponding bowl from receiving pet food from diverter 52.

§A. The Receptacle

Figure 3:
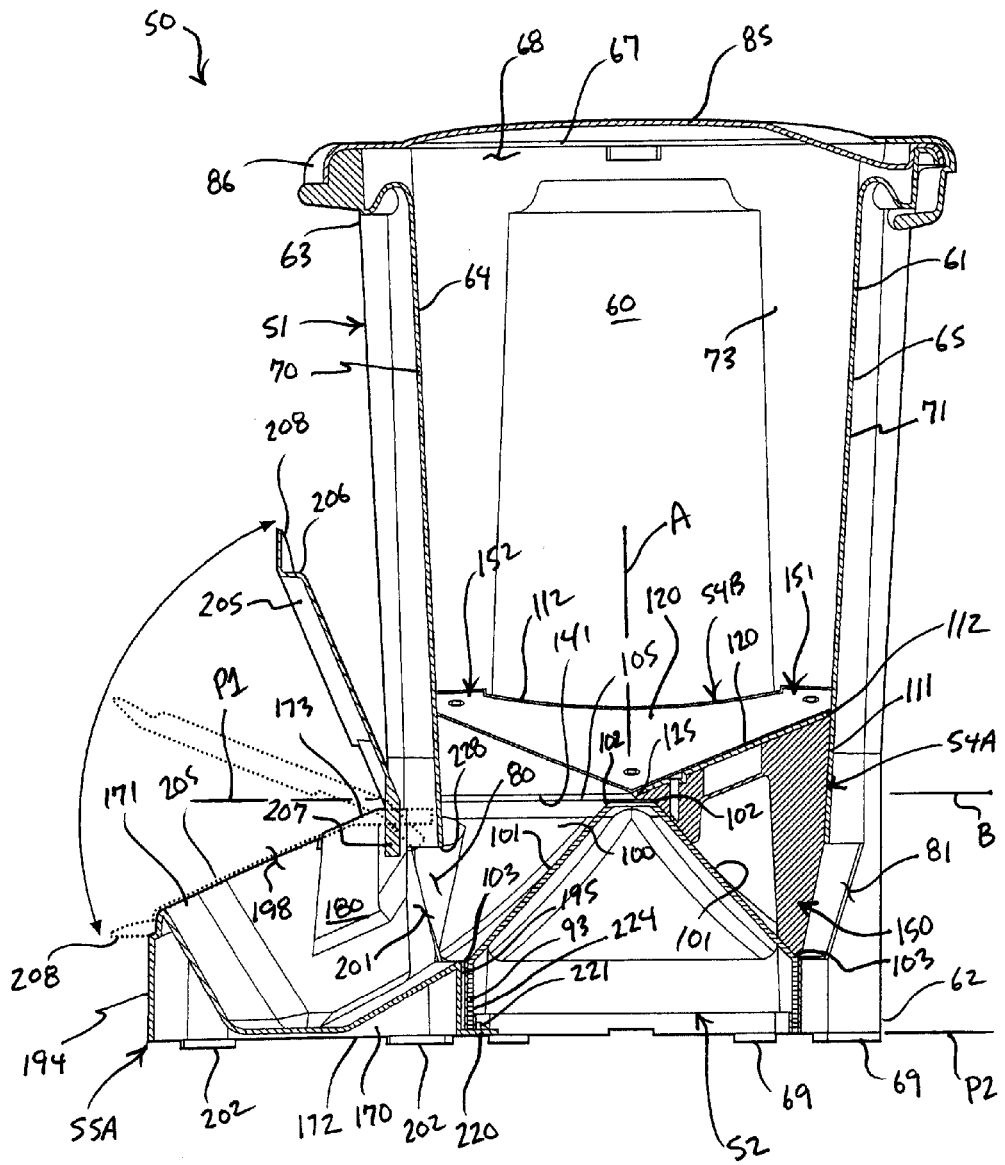
FIG. 3 is a vertical section view of the receptacle assembly constructed and arranged in accordance with the principle of the invention illustrating the receptacle, a bowl coupled to the receptacle, and the diverter formed in the receptacle for receiving and conveying material from the receptacle to the bowl.

Referencing FIGS. 1, 3, and 6-9 in relevant part, receptacle 51 is a container or bin that includes a volume 60 defined by a continuous sidewall 61 that extends between a bottom 62 and an opposed top 63. Continuous sidewall has opposed outer and inner surfaces 64 and 65 that extend between bottom 62 and top 63. Inner surface 65 of continuous sidewall 61 defines volume 60 between bottom 62 and top 63, and this is best illustrated in FIGS. 3 and 9. Top 63 is formed with an upper edge or rim 67, which encircles a main opening 68 leading to volume 60 at top 63. Top 63 of receptacle 51 is thus an open top that leads to volume 60. Bottom 62 is formed with an array of downwardly projecting feet 69, which are positionable upon a substantially horizontal surface providing a stable upright support for receptacle 51 when set onto a substantially horizontal surface. Receptacle 51 is preferably fabricated of plastic, metal, or other substantially rigid material or combination of rigid materials. Receptacle 51 is preferably integrally formed, but may be fashioned of a plurality of attached with welding, fasteners, joinery, or the like.

Sidewall 61 is generally square in shape forming in sidewall 61 four interconnected, upstanding panels including opposed substantially parallel panels 70 and 71, opposed substantially parallel panels 72 and 73, a corner 76 formed between panels 70 and 72 and an opposed corner 77 formed between panel 70 and panel 73, a corner 78 formed between panel 71 and panel 72 and an opposed corner 79 formed between panel 71 and panel 73. Corners 76-79 extend along the length of sidewall 61 from bottom 62 to top 63. At outer surface 65, corners 76, 77, 78, and 79 are outwardly directed, and at inner surface 64 corners 76, 77, 78, and 79 are inwardly directed, and are each exemplary of a groove or channel.

Openings 80, 81, 82, and 83 are formed in or otherwise through sidewall 61 proximate to bottom 62, lead to or otherwise communicate with volume 60, and operate to pass material from receptacle 51 to corresponding bowls 55A-55D. In the present embodiment there are four bowls 55A-55D and four corresponding openings 80, 81, 82, and 83 in sidewall 61. Openings 80, 81, 82, and 83 are substantially equal in size and shape. Openings 80, 81, 82, and 83 relate to panels 70, 71, 72, and 73, respectively. Opening 80 is formed through panel 70 at a generally intermediate position between corners 76 and 77 proximate to bottom 62, opening 81 is formed through panel 71 at a generally intermediate location between corners 78 and 79 proximate to bottom 62, opening 82 is formed through panel 72 at a generally intermediate location between corners 76 and 78 proximate to bottom 62, and opening 83 is formed through panel 73 at a generally intermediate location between corners 77 and 79 proximate to bottom 62. The relative position of openings 80, 81, 82, and 83 through the respective panels 70, 71, 72, and 73 of sidewall 61 is substantially the same. A trough 84 is formed in bottom 62 as shown in FIGS. 1, 6, 8, and 32 adjacent to each of openings 80, 81, 82, and 83. Each trough 84 projects into volume 60 from bottom 62 of receptacle 51 opposite to a corresponding one of openings 80, 81, 82, and 83.

Figure 2:
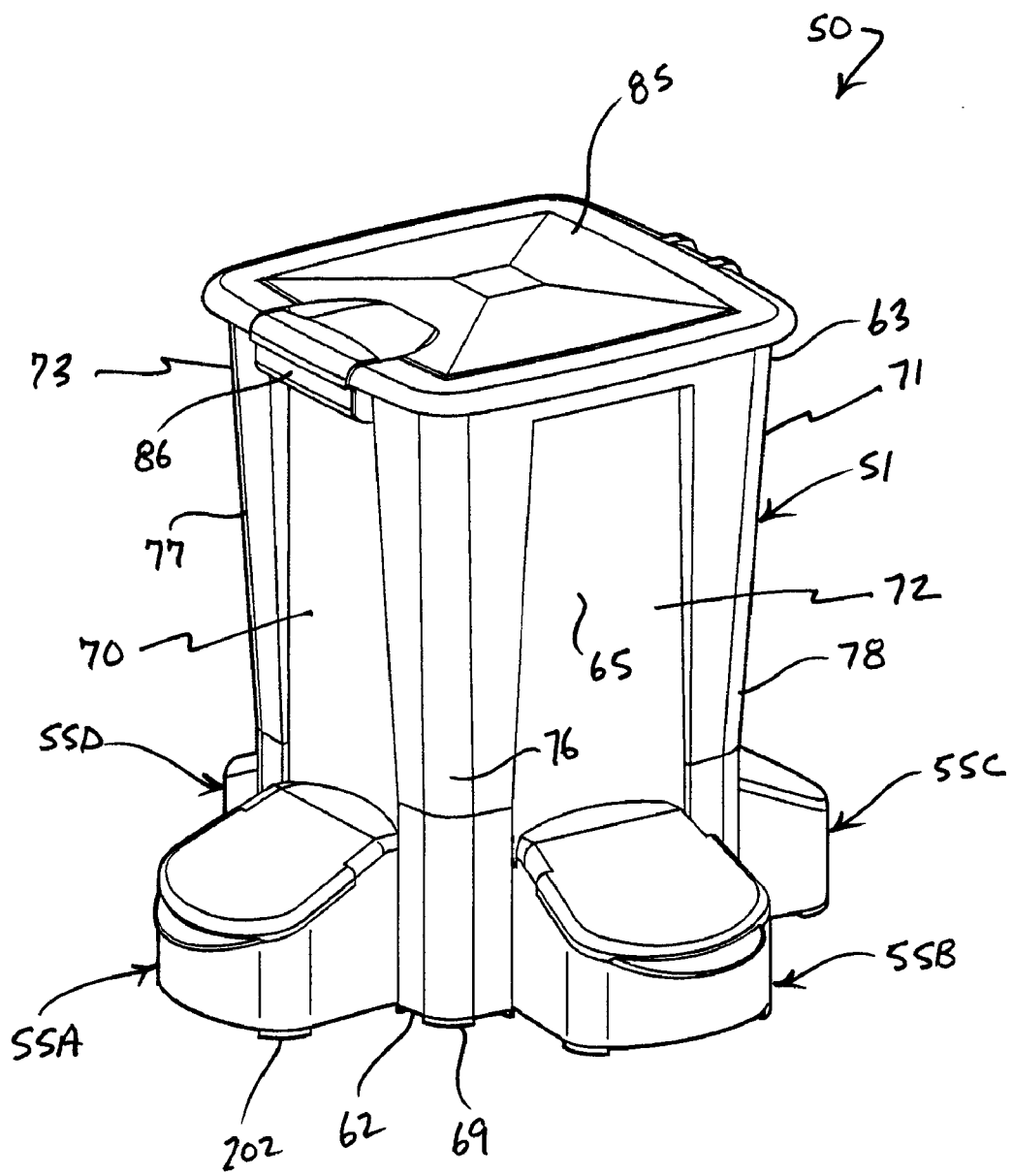
FIG. 2 is a perspective view of the receptacle assembly of FIG. 1 shown as it would appear assembled.

Receptacle 51 is fashioned with a lid 85 illustrated in FIGS. 1-3. Like receptacle 51, lid 85 is preferably fabricated of plastic, metal, or other substantially rigid material or combination of rigid materials, and is preferably integrally formed, but may be fashioned of a plurality of attached parts if so desired. Lid 85 is broad and generally flat as illustrated, and is mounted to receptacle 51 proximate to top 63 with a conventionally structured hinge for pivotal movement between an open position as shown in FIG. 1 away from rim 67 of top exposing main opening 68 to volume 60, and a closed position toward top as shown in FIG. 2 and against rim 67 as shown in FIG. 3 closing main opening 68 to volume 60.

In the present embodiment, lid 85 is mounted for pivotal movement to panel 71 of sidewall 61 proximate to top 63, and there is a conventionally structured catch 86 mounted for pivotal movement to panel 70 of sidewall proximate to top 63 with a conventionally structured hinge for pivotal movement between a disengaging position away from outer surface 65 and rim 67 of panel 70 of sidewall 61, and an engaging position toward outer surface 65 and rim 67 of panel 70 of sidewall 61. In the closed position of lid 85 shown in FIGS. 2 and 3, catch 86 may be pivoted from its disengaging position to its engaging position to embrace secure lid 85 in its closed position with receptacle 51. In the closed position lid 85 and the engaging position of catch 86, catch is received over and embraces the perimeter of lid 85 securing lid 85 in its closed position. To release lid 85 to permit it to be moved from its closed position as shown in FIGS. 2 and 3 to its open position as shown in FIG. 1, catch 86 need only be moved from its engaging position to its disengaging position. The foregoing generally described structure and function of lid 85 and catch 86 and the association of lid 85 and catch 86 with receptacle 51 is well known to those having ordinary skill in the art and are not discussed in further detail.

§B. The Diverter

Referring now in relevant part to FIGS. 10-13, diverter 52 consists of a fixture or body 90 fashioned of plastic, metal, or other substantially rigid material or combination of rigid materials. Fixture 90 is preferably integrally formed and is thus of unitary construction, such as through molding or machining, but may be fashioned of a plurality of parts securely attached with welding, fasteners, joinery, or the like.

Fixture 90 has a bottom denoted generally at 91, an opposed top denoted generally at 92, and a perimeter 93 that encircles a central axis A of fixture 90, which is the geometric center of fixture 90 about which fixture 90 is symmetrical. Legs 94 are formed in perimeter 93. Legs 94 are substantially equal in size and shape and each have a length extending between a lower end 95 thereof at bottom 91 and an opposed upper end 96 thereof at top 92. Legs 94 encircle axis A along perimeter 93, are substantially equally spaced-apart, and are arranged in a substantially square pattern as best seen in FIG. 11. Legs 94 each have an outer surface 97 that extends from lower end 95 to upper end 96. Outer surfaces 97 of legs 94 are shaped to relate to corners 76, 77, 78, and 79 (FIGS. 1, 6, and 8) at inner surface 94 of receptacle 51.

Top 92 is formed with upstanding partitions 100 and inclined chutes or channels 101. Partitions 100 and channels 101 radiate outwardly from the geometric center of fixture 90 defined by axis A to perimeter 93, and encircle axis A. Partitions 100 are substantially equal in size and shape, and channels 101 are substantially equal in size and shape, and this corresponds to the symmetry of diverter 52 about its geometric center at axis A.

Partitions 100 extend between the geometric center of fixture 90 defined by axis A to the respective legs 94. Channels 101 have opposed upper and lower ends 102 and 103. Channels 101 incline downwardly with respect to partitions 100 and top 92 from an upper end 102 thereof at top 92 from proximate to the geometric center of fixture 90 as defined by axis A to an opposed lower end 103 at perimeter 93. Lower ends 103 of channels 101 are each flanked on either side by a pair of opposed legs 94. Channels 101 are also flanked on either side by a pair of opposed partitions 100 extending from the geometric center of diverter 52 defined by axis A to corresponding legs 94. Each pair of partitions 100 flanking channels 101 cooperates to enclose and divide or otherwise separate the respective channels 101. Channels 101 are narrowed or tapered at upper end 102, and widen from upper end 102 to lower end 103. As such, upper end 102 of each channel 101 is considered a tapered or narrowed upper end, and lower end 103 of each channel 101 is considered an enlarged or widened lower end. Looking down upon top 92 of diverter 52, it is seen that channels 101 are each substantially triangular in shape.

Partitions 100 each have a central upper edge 105 at top 92 of diverter 52, and each divide a pair of adjacent channels 101. Upper edges 105 extend between upper ends 96 of the respective legs 94 and the geometric center of fixture 90 as defined by axis A. Upper edges 105 converge at the geometric center of diverter 52 defined by axis A. Referencing FIGS. 12 and 13, upper edges 105 reside along a plane P1 at top 62, and bottom 91 of diverter 52 resides along a plane P2. Plane P1 is substantially parallel with respect to the plane P2, and is substantially perpendicular with respect to axis A of diverter 52. Channels 101 incline downwardly from plane P1 at top 92 of diverter 52 toward plane P2 at bottom 91 of diverter 52.

Diverter 52 is installed with receptacle 51. To install diverter 52, diverter 52 is taken up and positioned bottom 91 first toward main opening 68 leading to volume 60 at top 63 of receptacle 51 as shown in FIG. 1. Legs 94 are registered with corners 76, 77, 78, and 79, as shown in FIG. 1, and diverter 52 presented downwardly into volume 60 through main opening 68 and is set into bottom 62 as shown in FIG. 3, and also in FIGS. 4A and 4B. The size of diverter 52 relates to receptacle 51 in that when diverter 52 is set into bottom 62 with legs 94 registered with corners 76, 77, 78, and 79, outer surfaces 97 of legs 94 frictionally nest into and against inner surface 64 of corners 76, 77, 78, and 79 at bottom 62 of receptacle 51 thereby releasably holding positioning diverter 52 in bottom 62 of receptacle 51 and locating channels 101 formed in diverter 52 between the respective legs 94 opposite to openings 80, 81, 82, and 83, formed in panels 70, 71, 72, and 73, respectively. If desired, receptacle 51 and diverter 52 may be sized such that lower ends 95 of legs 94 of diverter 52 rest atop trough 84 slung under lower ends 95 of legs 94 of diverter 52.

Figure 26:
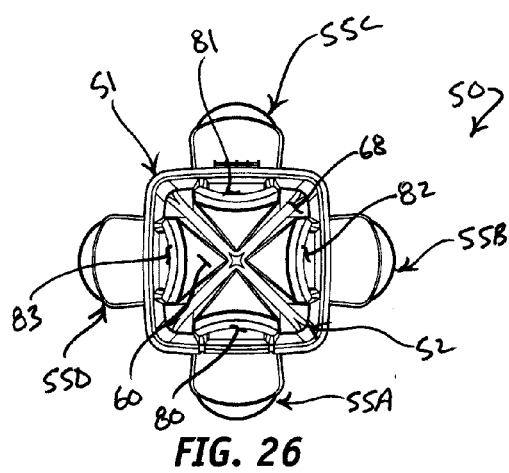
FIG. 26 is a top plan view of the receptacle assembly of FIG. 1 shown arranged with the diverter and four bowls.

And so in the installation or application of diverter 52 with receptacle, legs 94 are nested into corners 76, 77, 78, and 79 in that outer surfaces 97 of legs 94 are received by the inner surface 64 of the respective corners 76, 77, 78, and 79, and channels 101 formed between the respective legs 94 are each positioned opposite to and relate to openings 80, 81, 82, and 83. Channels 101 incline downwardly from the geometric center of diverter 52 as defined by axis A of diverter 52 from upper ends 102 to lower ends 103 toward the respective openings 80, 81, 82, and 83. The nesting of outer surfaces 97 of legs 94 of diverter 52 with respect to the inner surface 64 of corners 76, 77, 78, and 79 is also shown in FIG. 26, which is a top plan view of receptacle assembly 50 showing diverter 52 installed with respect to receptacle 51. The nesting between outer surfaces 97 of legs 94 of diverter 52 with respect to the inner surface 64 of corners 76, 77, 78, and 79 is a physical interaction between diverter 52 and inner surface 64 of receptacle 51, which ensures channels 101 align with or are otherwise registered with the respective openings 80, 81, 82, and 83 in the installation of diverter 52 with receptacle 51, and which prevents diverter 52 from rotating with respect to receptacle 51 about axis A of diverter 52 to prevent lateral displacement and misalignment of channels 101 with respect to the respective openings 80, 81, 82, and 83. In the installation of diverter 52 with receptacle 51, axis A defining the geometric center of diverter 52 about which diverter is symmetrical also defines the geometric center of receptacle 51 about which receptacle is substantially symmetrical.

Figure 4A:
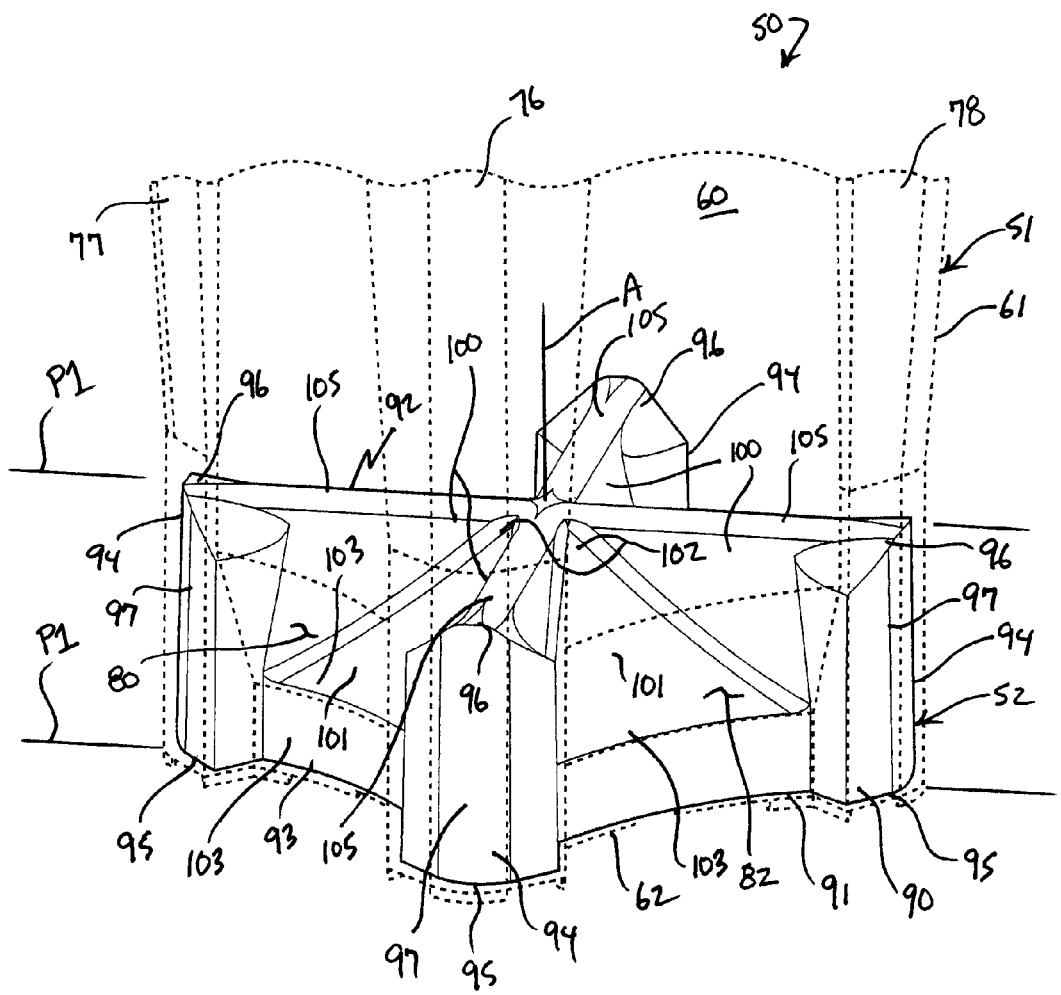
FIGS. 4A and 4B are perspective views of the diverter of the receptacle assembly of FIG. 1 shown at it would appear installed with respect to the receptacle, which is depicted in phantom outline for illustrative purposes.
Figure 4B:
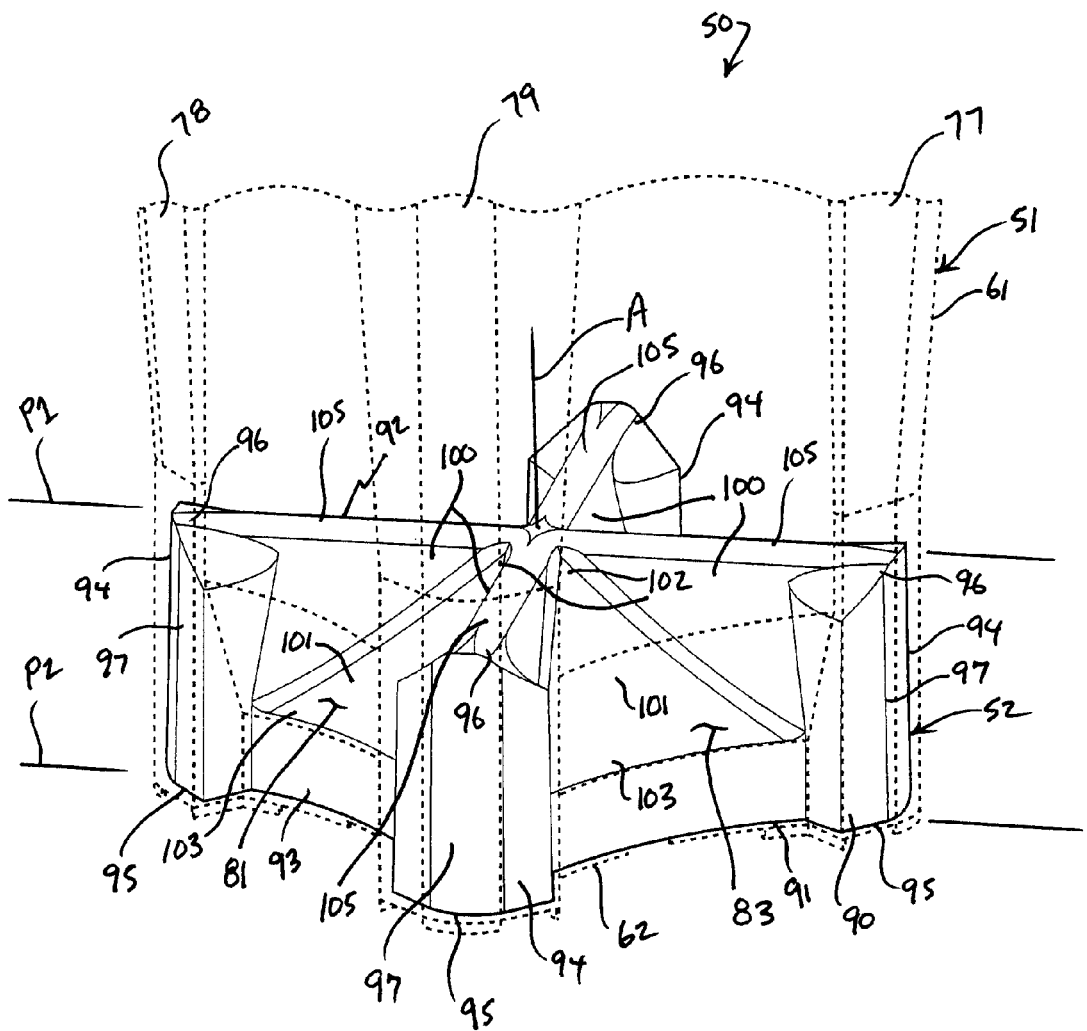

Having applied diverter 52 to receptacle 51 as described, channels 101 face upwardly into volume 60 toward main opening 68 into volume 60 as shown in FIG. 3, relate to openings 80, 81, 82, and 83, respectively, and operate to receive and convey by gravity material, such as pet food, from volume 60 to the respective openings 80, 81, 82, and 83 as illustrated in FIGS. 4A and 4B. Diverter 52 is removed from receptacle 51 simply by taking up diverter 52 and lifting it out of volume 60 of receptacle 51 through main opening 68. Diverter 52 is easily installed into receptacle 51 and removed from receptacle 51 as needed, such as for cleaning or repair or replacement. Because diverter 52 is removably positionable in bottom 62 of receptacle 51, channels 101 are each considered removably positionable in bottom 62 of receptacle 51. As channels 101 operate to convey material, such as pet food, as described, troughs 84 formed in bottom 62 of receptacle 51 as shown in FIGS. 1, 6, 8, and 32, collect crumbs and bits of material, such as pet food, from channels 101. The installation of diverter 52 with receptacle 51 according to the above discussion forms an exemplary embodiment of the invention.

§C. The Plugs

Plugs 54A-54C are each provided to be applied or otherwise installed with respect to diverter 52 and receptacle 51 in the assembly of receptacle assembly 50 to isolate a selected channel 101 and a corresponding one of openings 80, 81, 82, and 83 from volume 60 of receptacle 51 to prevent material in volume 60 from passing to the opening 80, 81, 82, or 83 relating to the selected channel 101. Plugs 54A-54C are identical to each other in size and shape and function and, moreover, in every respect. Accordingly, the details of one plug will now be discussed in detail, with the understanding that the ensuing discussion applies equally to each of plugs 54A-54C. For ease of discussion and reference, plug 54A is discussed below.

Referring now in relevant part to FIGS. 14-19, plug 54A consists of a body 110 fashioned of plastic, metal, or other substantially rigid material or combination of rigid materials. Body 110 is preferably integrally formed and is thus of unitary construction, such as through molding or machining, but may be fashioned of a plurality of parts securely attached with welding, fasteners, joinery, or the like. Body 110 is substantially that of a wedge generally having a front face 111 formed between opposed upper and lower edges 112 and 113, and opposed side edges 114 and 115 as best illustrated in FIG. 17. Generally triangular opposed upper/top and lower/bottom surfaces or faces 120 and 121, and generally triangular opposed side surfaces or faces 122 and 123 extend rearwardly from upper edge 112, lower edge 113, side edge 114, and side edge 115, respectively, of front face 111, and meet or otherwise intersect substantially at a point of body 110 denoted generally at 125.

Top face 120 meets side face 122 at edge 130, meets side face 123 at edge 131, and edges 130 and 131 converge at point 125. Edge 130 extends from the intersection of upper edge 112 and side edge 114 to point 125, and edge 131 extends from the intersection of upper edge 112 and side edge 115 to point 125. Bottom face 121 meets side face 122 at edge 132, meets side face 123 at edge 133, and edges 132 and 133 converge at point 125. Edge 132 extends from the intersection of lower edge 113 and side edge 114 to point 125, and edge 133 extends from the intersection of lower edge 113 and side edge 115 to point 125.

Referencing FIG. 18, body 110 defines a substantially central, horizontal axis or plane B extending horizontally through body 110 from front face 111 to point 125. Top face 120 is flat or planar. Top face 120 is inclined with respect to plane B of body 110, and inclines downwardly from upper edge 112 to point 125. Bottom face 121 is inclined with respect to plane B of body 110, and inclines upwardly from lower edge 113 to point 125.

In general, body 110 is characterized by tip or point 125 which enlarges outwardly therefrom along top face 120, bottom face 121, and side faces 122 and 123 to front face 111, which is wide and broad. As best seen in FIGS. 14 and 16, side face 122 angles inwardly between edges 130 and 132 to form an inwardly directed shelf 140 in side face 122, which extends from side edge 114 to point 125. As best seen in FIGS. 14 and 16, side face 123 angles inwardly between edges 131 and 133 to form an inwardly directed shelf 141 in side face 122, which extends from side edge 115 to point 125. Shelves 140 and 141 reside in or otherwise extend along plane B of body 110. The formation of shelves 140 and 141 in either side of body 110 between point 125 of body 110 and front face 111 of body 110 forms in body 110 a narrowed formation that is a socket denoted generally at 150 at a lower end 155 of body 110 under and opposite to top face 121, and opposed lobes 151 and 152 at the opposed upper end 156 of body 110 at front face 111 opposite to point 125.

As previously discussed, channels 101 of diverter 52 face upwardly into volume 60 toward main opening 68 into volume 60 as shown in FIG. 3, and channels 101 operate to receive and convey by gravity material, such as pet food, from volume 60 to the respective openings 80, 81, 82, and 83 as illustrated in FIGS. 4A and 4B. Plug 54A may be applied to one of the channels 101 of diverter 52 to isolate the channel 101 from receiving material from volume 60 and to isolate the corresponding one of openings 80, 81, 82, and 83 of receptacle 51 from receiving material from the channel 101 if so desired. The installation of plug 54A will be discussed in conjunction with channel 101 relating to opening 81 formed in pane 71 of sidewall 61.

The size of plug 54A relates to channel 101 corresponding to opening 81. To apply or otherwise install plug 54A to isolate from volume 60 channel 101 in diverter 52 and corresponding opening 81 in receptacle 51, plug 54A is taken up and positioned socket 150 first toward main opening 68 leading to volume 60 at top 63 of receptacle 51 as shown in FIG. 1. Front face 111 is directed toward and against inner surface of panel 71, socket 150 is inserted squarely into channel 101 between partitions 100 (not shown) opposite to opening 81, and shelves 140 and 141 are brought to rest atop upper edges 105 of the respective partitions.

Figure 32:
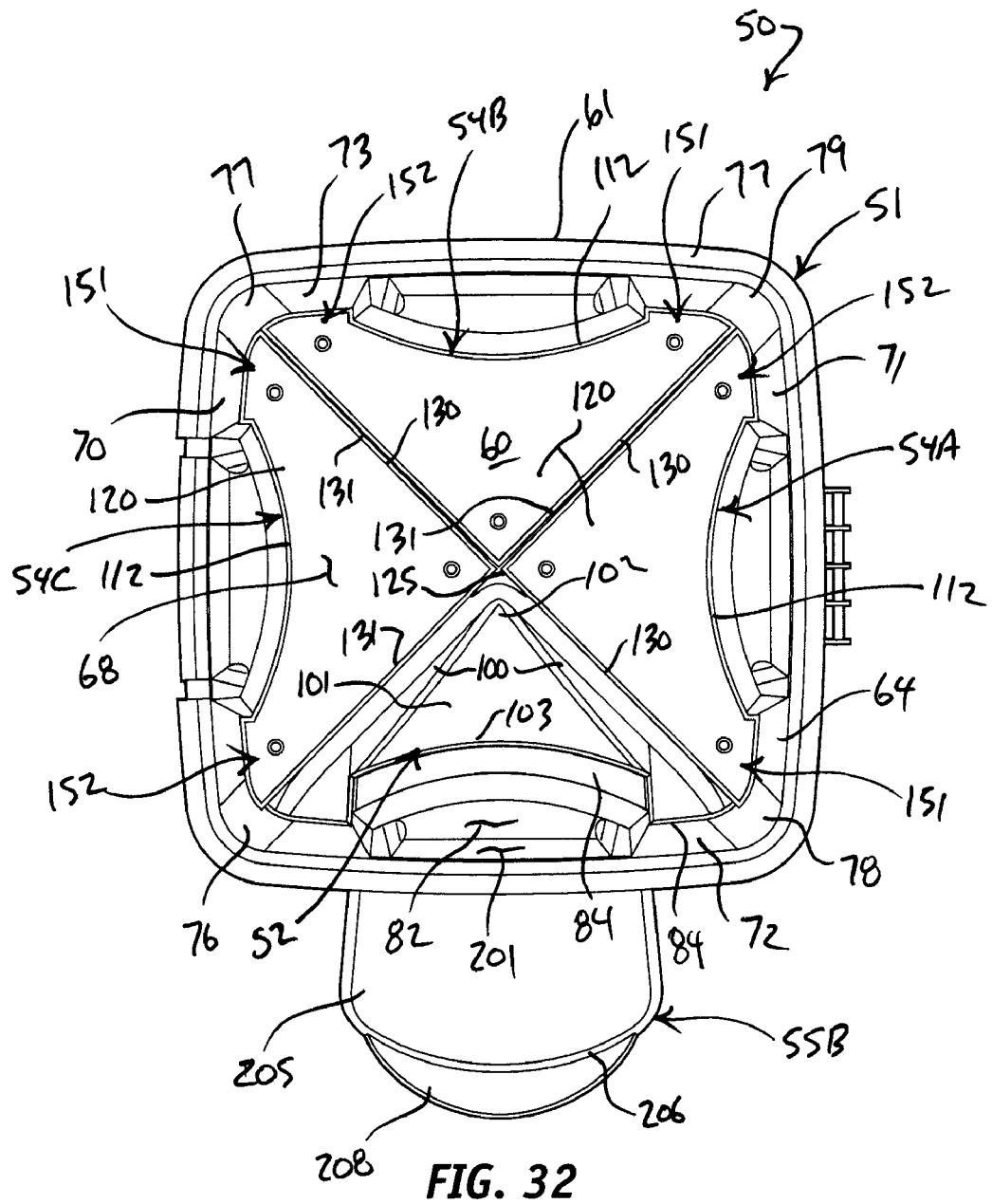
FIG. 32 is a top plan view of the receptacle assembly of FIG. 1 shown arranged with one bowl, the diverter, and three plugs applied between the diverter and the receptacle.

This application or installation of plug 54A with diverter 52 and receptacle 51 is characterized by a concurrently placement of front face 111 across opening 81 and against and across inner surface 64 of panel 71 of sidewall 61 above opening 81 as shown in FIG. 3 to lobes 151 and 152 applied into and against inner surface 64 of corners 78 and 79 as substantially shown in FIG. 32, socket 150 in channel 101 between the corresponding partitions 100 as substantially shown in FIG. 3, and shelves 140 and 141 against and atop upper edges 105 of the respective partitions 100, in which shelves 140 and 141 extend along the entire length of upper edges 105 of the respective partitions 100 from upper ends 96 of the respective legs 94 associated with the respective partitions 100 to point 125 of plug 54A located at the geometric center of diverter 52 defined by axis A, in which top face 120 faces upwardly into volume 60 toward main opening 68. The application of lobes 151 and 152 into and against inner surface 64 of corners 78 and 79 as substantially shown in FIG. 32 is a nesting of lobes 151 and 152 in the respective corners 78 and 79.

Figure 5:
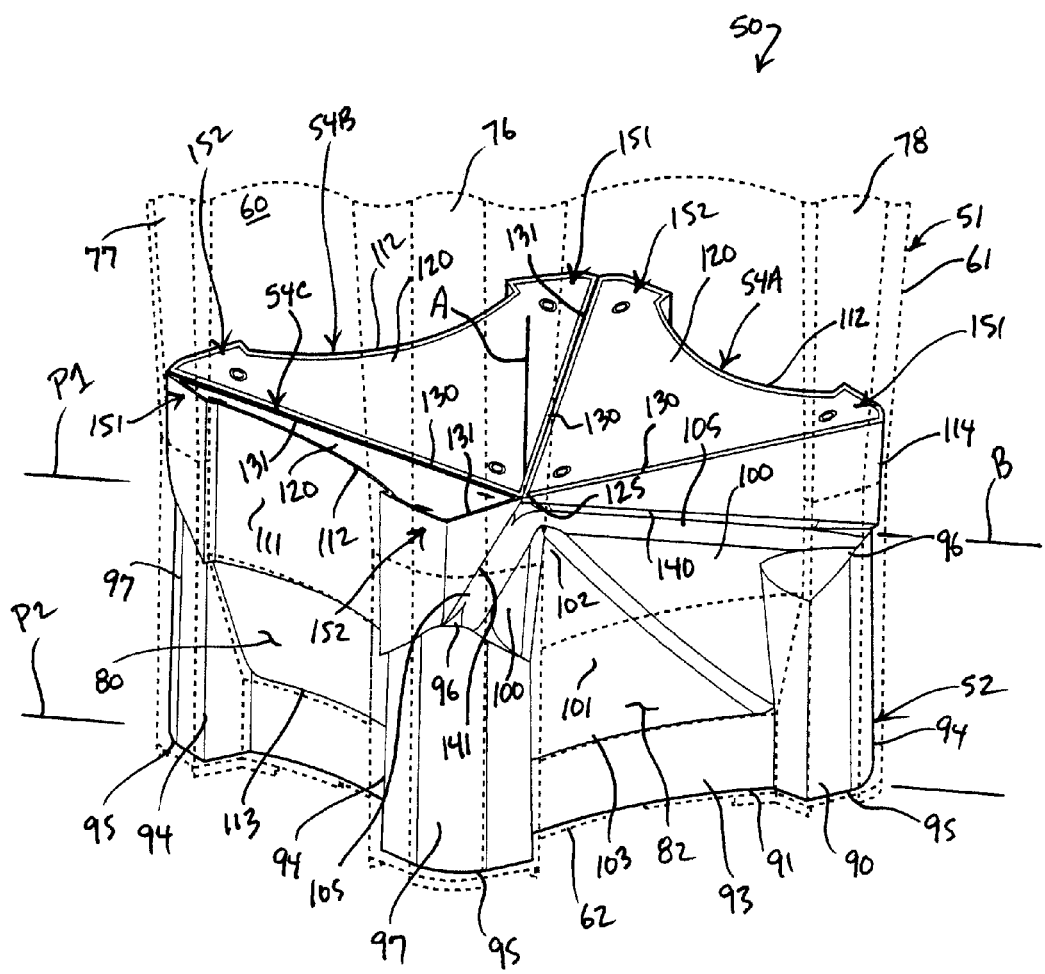
FIG. 5 is a view similar to that of FIG. 4A illustrating plugs installed with respect to the diverter.

FIG. 5 illustrates shelf 140 applied against and atop upper edge 105 of partition 100, in which shelf 140 is shown extending along the entire length of upper edge 105 of partition 100 from upper end 96 of the corresponding leg 94 to point 125 of plug 54A located at the geometric center of diverter 52 defined by axis A. Although the placement of shelf 141 atop the upper edge 105 of the opposing partition 100 associated with channel 101 corresponding to opening 81 is not expressly shown, installation of shelf 141 is identical to that of shelf 140. However, for illustrative purposes, FIG. 5 illustrates plug 54C as it would appear installed with diverter 52 and receptacle 51 in the channel 101 (not illustrated in FIG. 5) associated with opening 80 in the exact manner as plug 54A, and the application of shelf 141 applied against and atop upper edge 105 of partition 100, in which shelf 141 is shown extending along the entire length of upper edge 105 of partition 100 from upper end 96 of the corresponding leg 94 to point 125 of plug 54A located at the geometric center of diverter 52 defined by axis A. This installation of plug 54A with diverter 52 and receptacle 51 effectively plugs the channel 101 associated with opening 81 thereby isolating channel 101 and corresponding opening 81 from volume 60 preventing material, such as pet food, from passing from volume 60 into channel 101 corresponding to opening 81 and into and through opening 81 via the corresponding channel 101.

As previously explained, shelves 140 and 141 reside in or otherwise extend along plane B of body 110, and top face 120 of plug 54A is inclined with respect to plane B of body 110 as denoted in FIGS. 18 and 19, and inclines downwardly from upper edge 112, which extends along inner surface 64 of panel 71 from lobe 151 at corner 78 to lobe 152 at corner 179, to point 125 located at the geometric center of diverter 52 as defined by axis A of diverter 52. As such, in the installation of plug 54A with diverter 52 and receptacle 51, plane B resides along or is otherwise concurrent with plane P1 of upper edges 105 of top 62 of diverter 52, and top face 120 of plug 54A is inclined with respect to planes B and P1 as shown in FIG. 3, and inclines downwardly from upper edge 112 extending across inner surface 64 of panel 71 of sidewall 61, from lobe 151 to lobe 152 (FIG. 32), to point 125 and to the adjacent channels 101 associated with openings 80, 82, and 83. Because top face 120 faces upwardly into volume 60 toward main opening 68 and inclines downwardly from upper edge 112 extending across inner surface 64 of panel 71 of sidewall 61, from lobe 151 to lobe 152 (FIG. 32), to point 125 and to the adjacent channels 101 associated with openings 80, 82, and 83, top face 120 is a diverter face or diverter of plug 54A and is operative for receiving and conveying material, such as pet food, from volume 60 to inclined channels 101 associated with openings 80, 82, and 83, in accordance with the principle of the invention.

Referencing FIG. 3, channel 101 relating to opening 81 is opposite to, and also considered adjacent to, channel 101 associated with opening 80. As channel 101 relating to opening 80 opposite to the installed plug 54A in channel 101 relating to opening 81 is free of a plug or otherwise unoccupied, top face 120 of plug 54A, which faces upwardly into volume 60 toward main opening 68, inclines downwardly toward channel 101 associated with opening 80 and is operative for receiving and conveying material, such as pet food, from volume 60 to inclined channel 101 associated with opening 80, in accordance with the principle of the invention. Channels 101 associated with openings 82 and 82 are also adjacent to channel 101 associated with opening 81. With channels 101 associated with openings 82 and 83 free of plugs, with plug 54A installed with channel 101 associated with opening 81 top face 120 likewise inclines downwardly toward channels 101 associated with openings 82 and 83 and is operative for receiving and conveying material, such as pet food, from volume 60 to inclined channels 101 associated with openings 82 and 83, in accordance with the principle of the invention.

As plugs 54A-54C are each provided to be installed between diverter 52 and receptacle 51 in the assembly of receptacle assembly 50 to isolate a selected channel 101 and a corresponding one of openings 80, 81, 82, and 83 from volume 60 of receptacle 51, one plug may be installed to isolate from volume 60 one channel and its corresponding opening, two plugs may be installed to isolate from volume 60 two channels and their respective openings, or three plugs may be installed to isolate from volume three channels and their respective openings. The determination of how many plugs to install depends on the number of openings a user wishes to convey material to from volume 60 of receptacle 51, whether to all four openings 80, 81, 82, and 83 in which no plugs are installed, three of openings 80, 81, 82, and 83 in which one plug is installed in conjunction with one channel 101 of diverter 52, two of openings 80, 81, 82, and 83 in which two plugs are installed in conjunction with two channels 101 of diverter 52, or just one of openings 80, 81, 82, and 83 in which all three plugs are installed in conjunction with three channels 101 of diverter 52.

FIG. 5 represents plug 54A as it would appear installed in channel 101 (not shown) associated with opening 81 (not shown) as described in detail above. FIG. 5 also represents plug 54B as it would appear installed in adjacent channel 101 (not shown) associated with opening 83 (not shown), and also plug 54C as it would appear installed in adjacent channel 101 (not shown) associated with opening 80. This installation of plugs 54A, 54B, and 54C is also shown in FIG. 32. Although not completely illustrated and referenced in FIGS. 5 and 32 taken in relevant part, the installation of plug 54B with diverter 52 and receptacle 51 is characterized in exactly the same manner as the installation of plug 54A in channel 101 associated with opening 81, in which front face 111 extends across opening 83 and against and across inner surface 64 of panel 73 of sidewall 61 above opening 81 to lobes 151 and 152 applied to or otherwise nested into and against inner surface 64 of corners 79 and 77 as substantially shown in FIG. 32, in which lobe 151 of plug 54B meets lobe 152 of plug 54A forming a concurrent nesting of lobe 151 of plug 54B and lobe 152 of plug 54A into corner 79, and edge 130 of plug 54B meets edge 131 of plug 54A making top face 120 of plug 54B substantially contiguous with top face 120 of plug 54A, in accordance with the principle of the invention. At the intersection of edge 130 of plug 54B and edge 131 of plug 54A, shelf 140 of plug 54B and shelf 141 of plug 54A meet, and are concurrently received atop upper edge 105 of the corresponding partition.

Furthermore, the installation of plug 54C with diverter 52 and receptacle 51 is characterized in exactly the same manner as the installation of plug 54A in channel 101 associated with opening 81, in which front face 111 extends across opening 80 and against and across inner surface 64 of panel 70 of sidewall 61 above opening 81 to lobes 151 and 152 applied into and against inner surface 64 of corners 77 and 76 as substantially shown in FIG. 32, in which lobe 151 of plug 54C meets lobe 152 of plug 54B forming a concurrent nesting of lobe 151 of plug 54C and lobe 152 of plug 54B into corner 77, and edge 130 of plug 54C meets edge 131 of plug 54B making top face 120 of plug 54C substantially contiguous with top face 120 of plug 54B, in accordance with the principle of the invention. At the intersection of edge 130 of plug 54C and edge 131 of plug 54B, shelf 140 of plug 54C and shelf 141 of plug 54B meet, and are concurrently received atop upper edge 105 of the corresponding partition.

This discussion demonstrates that the top faces 120 of plugs applied side-by-side to adjacent channels form substantially contiguous top faces 120 that cooperate together to receive and convey material from volume 60 of receptacle 51 to any channel free of a plug, in accordance with the principle of the invention. In FIG. 5, as a matter of example, plugs 54A, 54B, and 54C are installed side-by-side in adjacent channels such that top faces 120 of plugs 54A, 54B, and 54C are substantially contiguous and are inclined downwardly toward channel 101 associated with opening 82 that is free of a plug, and cooperate together to receive and convey material from volume 60 of receptacle 51 to channel 101 associated with opening 82.

§D. The Bowls

Bowls 55A-55D are configured to be applied or otherwise coupled directly to receptacle 51 in a radial pattern around the bottom of receptacle 51 opposite to openings 80, 81, 82, and 83, and diverter 52 is structured to receive pet food placed in receptacle 51 and convey the pet food by gravity to the bowls 55A-55D via the corresponding openings 80, 81, 82, and 83. Bowls 55A-55D are identical to each other in every respect. Accordingly, the details of one bowl will now be discussed in detail, with the understanding that the ensuing discussion applies equally to each bowl. For ease of discussion and reference, the bowl discussed below is bowl 55A.

Referring now in relevant part to FIGS. 20-23, bowl 55A consists of a body 170 fashioned of plastic, metal, or other substantially rigid material or combination of rigid materials. Body 170 is preferably integrally formed and is thus of unitary construction, such as through molding or machining, but may be fashioned of a plurality of parts securely attached with welding, fasteners, joinery, or the like. Body 170 forming bowl 55A includes an upright, generally U-shape sidewall 171 that extends between a bottom 172 and an opposed top 173. Sidewall 171 has opposed inner and outer surfaces 174 and 175. A floor or bottom wall 176 is formed in bottom 172. Inner surface 174 of sidewall 171 extends between bottom wall 176 and top 173, and outer surface 175 extends between bottom 172 and top 173. Inner surface 174 of sidewall 171 defines volume 180 between bottom wall 176 and top 173.

Sidewall 171 is formed by opposed, substantially parallel side panels 190 and 191, and end panel 192. End panel 192 is formed at a rear end 194 of bowl 55A, and side panels 190 and 191 extend forwardly from end panel 192 to a front end 195 of bowl 55A. Top 173 of sidewall 171 is formed with an upper edge or rim 197, which encircles an upper opening 198 that overlies and opposes bottom wall 176 and that leads to volume 180 at top 173. Top 173 is thus an open top that leads to volume 180. Side panels 190 and 191 and bottom wall 176 at front end 195 cooperate to define an edge 200 that bounds a front opening 201 at front end 195 that leads into volume 180. Bottom 172 is formed with an array of downwardly projecting feet 202, which are positionable upon a substantially horizontal surface providing a stable upright support for bowl 55A.

Figures 24, 25:
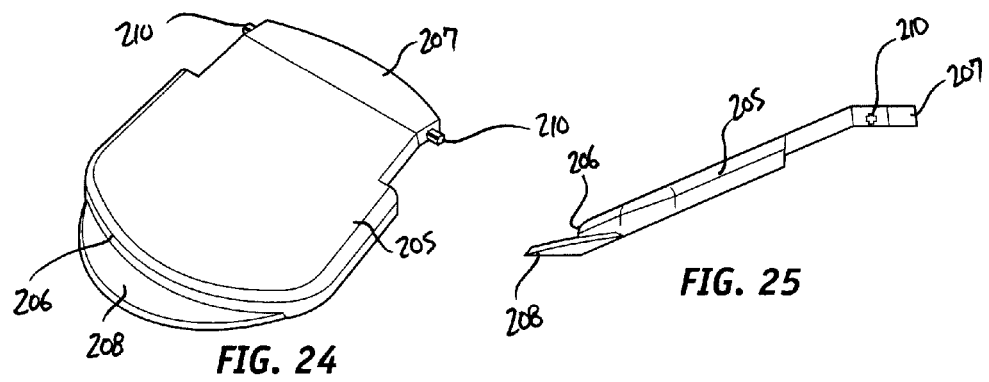
FIG. 24 is a perspective view of a lid for use with the bowl of FIG. 20.
FIG. 25 is a side elevation view of the lid of FIG. 24.

Bowl 55A is fashioned with a lid 205, which is illustrated in FIGS. 24 and 25. Like body 170 forming bowl 55A, lid 205 is preferably fabricated of plastic, metal, or other substantially rigid material or combination of rigid materials, and is preferably integrally formed, but may be fashioned of a plurality of attached parts if so desired. Lid 205 is broad and generally flat as illustrated, and has opposed front and rear ends 206 and 207. Front end 206 is formed with a lip 208. Rear end 207 of lid 205 is mounted to body 170 proximate to top 173 at front end 195 of body 170 with a conventionally structured hinge for pivotal movement of lid 205 between an open position as shown in FIG. 3 away from rim 197 of top 173 exposing upper opening 198 to volume 180, and a closed position toward top 173 as shown in phantom line in FIG. 3 and against rim 197 closing upper opening 198 to volume 180. The hinge structure formed between lid 205 and body 170 is a conventional hinge consisting of opposed lugs 210 formed in rear end 207 on either side of lid 205, which are received by corresponding sockets 211 formed in side panels 190 and 191 proximate to top 173 at front end 195. In the closed position of lid 205 indicated in phantom outline in FIG. 3, lip 208 projects outward from outer surface 175 of end panel 192, and lid 205 is easily opened to gain access to volume 180 through upper opening 198 simply by applying a gentle lifting force along the underside of lip 208 to move lid 205 upwardly into its open position from its closed position.

In the present embodiment, bowl 55A is associated with panel 70 of receptacle 51 and opening 80 formed in panel 70 as referenced in FIGS. 1 and 2. Bowl 55A is releasably engagable to receptacle 51 at panel 70 with an engagement assembly that, in this specific embodiment, is formed between bowl 55A and diverter 52 positioned in receptacle 51 as previously described.

Figures 20, 21:
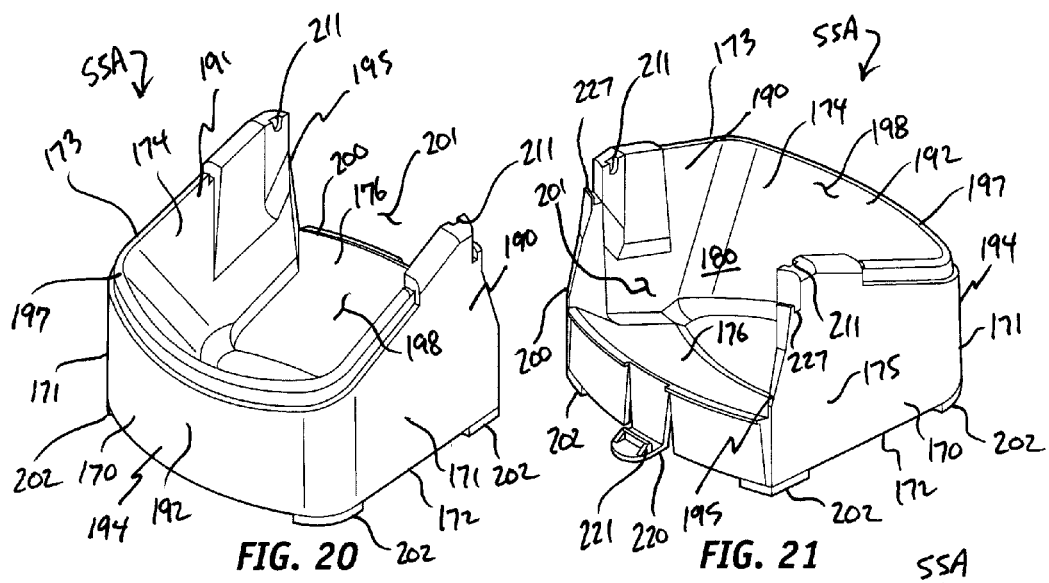
FIG. 20 is a front perspective view of one of the bowls of the receptacle assembly of FIG. 1.
FIG. 21 is a rear perspective view of the bowl of FIG. 20.
Figures 22, 23:
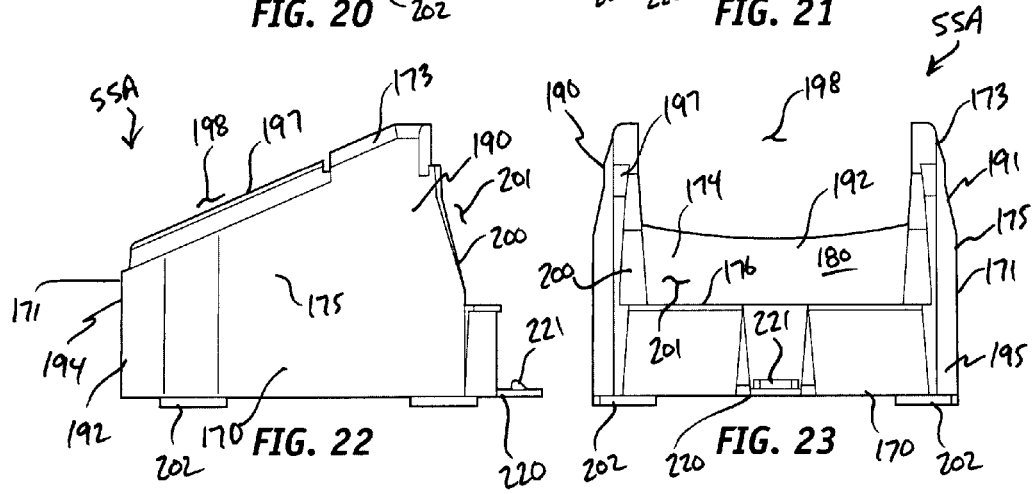
FIG. 22 is a side elevation view of the bowl of FIG. 20.
FIG. 23 is a rear elevation view of the bowl of FIG. 20.

Referencing FIGS. 21-23, the engagement assembly formed between bowl 55A and diverter 52 positioned in receptacle 51 consists of a resilient flexural tab 220, formed with an abutment 221, formed in front end 195 of body 170 of bowl 55A proximate to bottom 172 at a generally intermediate location between side panels 190 and 191. To install bowl 55A with respect to receptacle 51, receptacle 51 and bowl 55A are positioned upright on a horizontal support surface and front end 195 is directed toward outer surface 65 of panel 70 opposite to opening 80 registering front opening 201 of bowl 55A with opening 80 in panel 70. Bowl 55A is moved toward opening 80 to apply front end 195 of bowl 55A against outer surface 65 directing front opening 201 of bowl 55A at opening 80 in panel 70, and tab 220 is received by a recessed notch 222 (FIGS. 1, 6, and 7) formed in panel 70 at bottom 62 of receptacle 51 under opening 80 and snaps into place applying abutment 221 against inner surface 224 of perimeter 93 of diverter 52 thereby captively and removably retaining bowl 55A to receptacle 51. So installed, front end 195 of bowl 55A is applied against outer surface 65 of panel 70 of sidewall 61 of receptacle 51, and front opening 201 of bowl 55A confronts and communicates with opening 80 leading to volume 60 of receptacle 51 to permit material to pass into volume 180 of bowl 55A from volume 60 of receptacle 51 first through opening 80 formed in panel 70 and then through front opening 201 formed in bowl 55A.

As seen in FIG. 21, edge 200 of bowl 55A is formed with opposed, upwardly directed notches 227 formed on either side of bowl 55A at panels 190 and 191 proximate to top 173 along front end 195 of bowl 55A. These notches 227 are first applied under and receive upper lip 228 of opening 80 referenced in FIGS. 3 and 6, after which bowl 55A is pitched forwardly toward outer surface 65 of panel 70 of sidewall to apply tab 220 in recessed notch 222 (FIGS. 1, 6, and 7) formed in panel 70 at bottom 62 of receptacle 51 under opening 80 to snap apply abutment 221 against inner surface 224 of perimeter 93 of diverter 52 to secure and captively and removably retain bowl 55A to receptacle 51. Notches 227 and upper lip 228 of opening 80 may be considered part of the engagement assembly formed between bowl 55A and diverter 52. Other forms of engagement assemblies may be formed between bowl 55A and receptacle 51 to removably secure bowl 55A with respect to receptacle 51 without departing from the invention.

FIGS. 2 and 26 illustrate bowls 55A-55D applied to, or otherwise installed with, receptacle 51. Bowl 55A is installed at panel 70 as shown, and relates to opening 80 in panel 70 as shown in FIGS. 3 and 26. Bowl 55B is installed at panel 72 as shown in FIGS. 2 and 26, and relates to opening 82 in panel 72 as shown in FIG. 26. Bowl 55C is installed at panel 71 as shown in FIGS. 2 and 26, and relates to opening 81 in panel 71 as shown in FIG. 26. Bowl 55D is installed at panel 73 as shown in FIGS. 2 and 26, and relates to opening 83 in panel 73 as shown in FIG. 26. In this installation of bowls 55A-55D with respect to receptacle 51, bowls 55A-55D are operatively coupled to receptacle 51 to receive material, such as pet food, from volume 60. With respect to this installation and operative coupling of bowl 55A with respect to opening 80 of receptacle 51, channel 101 relating to opening 80 may receive and convey material by gravity from volume 60 into and through opening 80, and bowl 55A is installed to receive material from opening 80, which passes from opening 80 and into volume 180 of bowl 55A through front opening 201 formed in front end 195 of bowl 55A as seen in FIG. 3. Once the material is applied to volume 180 of bowl 55A, the material in volume 180 may be accessed through upper opening 198 of bowl 55A simply by opening lid 205 in the manner described above. In the case of the material applied to volume 60 being pet food, a pet may simply apply his nose under lip 208 and press upwardly to open lid 205 to gain access to the pet food in bowl 55A for eating purposes. Lid 205 is configured to close by gravity after the force required to open lid 205 is removed to protect the food from insects and the like until the pet comes back for another meal. As the material in bowl 55A is depleted, it will be refilled or replenished by gravity flow of the material into volume 180 of bowl 55A from volume 60 of receptacle 51 as described. The operative coupling of bowl 55B with respect to opening 82 of receptacle 51, the operative coupling of bowl 55C with respect to opening 81 of receptacle 51, and the operative coupling of bowl 55D with respect to opening 83 of receptacle 51, and the use of bowls 55B-55D is identical to that of bowl 55A and are not repeated.

Receptacle assembly 51 may be arranged with four bowls, three bowls, two bowls, or one bowl. As receptacle assembly 51 is particularly useful in feeding pets, such as dogs and cats, four bowls may be used with receptacle assembly 51 to feed four animals simultaneously, three bowls may be used with receptacle assembly 51 to feed three animals simultaneously, two bowls may be used with receptacle assembly 51 to feed two animals simultaneously, and one bowl may be used with receptacle assembly 51 to feed one animal. Examples of configurations of receptacle assembly 51 are shown as a matter of example in FIGS. 26-32.

Figure 29:
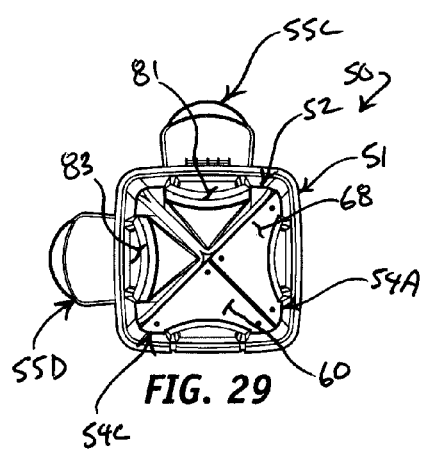
FIGS. 28-31 are top plan view of the receptacle assembly of FIG. 1 showing various arrangements of the bowls and the plugs installed between the receptacle and the diverter.
Figure 27:
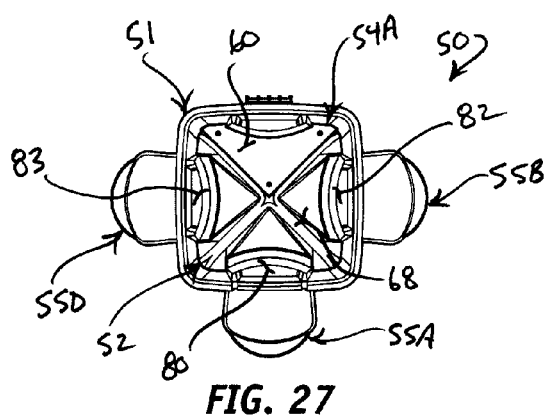
FIG. 27 is a top plan view of the receptacle assembly of FIG. 1 shown arranged with three bowls, the diverter, and one plug applied to the diverter.
Figure 30:
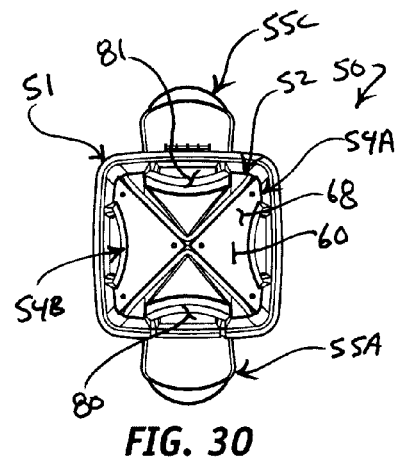
Figure 28:
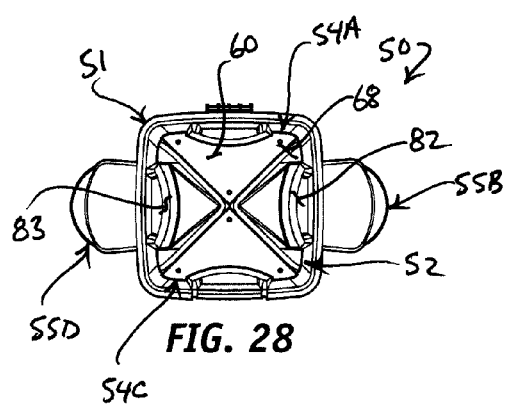
Figure 31:
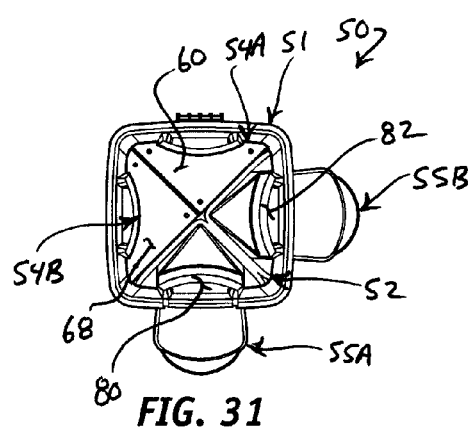

And so as a matter of example, FIGS. 2 and 26 illustrate receptacle assembly 51 configured with four bowls 55A, 55B, 55C, and 55D applied to receptacle 51 and operatively coupled to openings 80, 82, 81, and 83, respectively. FIG. 27 illustrates receptacle assembly 51 configured with three bowls 55A, 55B, and 55D applied to receptacle 51 and operatively coupled to openings 80, 82, and 83, respectively, with plug 54A applied to diverter 52 isolating opening 81 (not shown) from volume 60 of receptacle 51. The application of plug 54A to channel 101 corresponding to opening 81 was previously discussed in shown in connection with FIG. 3. FIG. 28 illustrates receptacle assembly 51 configured with two bowls 55B and 55D applied to receptacle 51 and operatively coupled to openings 82 and 83, respectively, with plug 54A applied to diverter 52 isolating opening 81 (not shown) and its corresponding channel 101 (not shown) from volume 60 of receptacle 51, and plug 54C applied to diverter 52 isolating opening 80 (not shown) and its corresponding channel 101 (not shown) from volume 60 of receptacle. FIG. 29 illustrates receptacle assembly 51 configured with two bowls 55C and 55D applied to receptacle 51 and operatively coupled to openings 81 and 83, respectively, with plug 54A applied to diverter 52 isolating opening 82 (not shown) and its corresponding channel 101 (not shown) from volume 60 of receptacle 51, and plug 54C applied to diverter 52 isolating opening 80 (not shown) and its corresponding channel 101 (not shown) from volume 60 of receptacle. FIG. 30 illustrates receptacle assembly 51 configured with two bowls 55A and 55C applied to receptacle 51 and operatively coupled to openings 80 and 81, respectively, with plug 54A applied to diverter 52 isolating opening 82 (not shown) and its corresponding channel 101 (not shown) from volume 60 of receptacle 51, and plug 54B applied to diverter 52 isolating opening 83 (not shown) and its corresponding channel 101 (not shown) from volume 60 of receptacle. FIG. 31 illustrates receptacle assembly 51 configured with two bowls 55A and 55B applied to receptacle 51 and operatively coupled to openings 80 and 82, respectively, with plug 54A applied to diverter 52 isolating opening 81 (not shown) and its corresponding channel 101 (not shown) from volume 60 of receptacle 51, and plug 54B applied to diverter 52 isolating opening 83 (not shown) and its corresponding channel 101 (not shown) from volume 60 of receptacle. Finally, FIG. 32 illustrates receptacle assembly 51 configured with one bowl 55B applied to receptacle 51 and operatively coupled to opening 82, respectively, with plug 54A applied to diverter 52 isolating opening 82 (not shown) and its corresponding channel 101 (not shown) from volume 60 of receptacle 51, with plug 54B applied to diverter 52 isolating opening 83 (not shown) and its corresponding channel 101 (not shown) from volume 60 of receptacle 51, and plug 54C applied to diverter 52 isolating opening 80 (not shown) and its corresponding channel 101 (not shown) from volume 60 of receptacle. The inclined top faces 120 of the plugs applied to diverter in the various configurations of receptacle assembly 51 illustrated in FIGS. 27-32 are each operative for receiving and conveying material from volume 60 of receptacle to each unoccupied channel as previously explained, which is a channel free of a plug allowing the corresponding opening in receptacle 51 to receive material from the corresponding channel to, for instance, convey the material to an awaiting bowl operatively coupled to the opening relating to the unoccupied channel.

An exemplary receptacle assembly 51 is disclosed, and is particularly useful as a pet-feeding system for providing one or more pets with a reliable and easily-accessible source of pet food. Pet food, such as dry pet food or kibble, may be placed into volume 60 through main opening 68 formed in top 63 of receptacle, which is received by channels 101 formed in diverter 52 removably applied to bottom 62 of receptacle 51. Channels 101 relate to the respective openings 80, 81, 82, and 82 formed in bottom 62 of receptacle 51 and receive and convey the pet food from volume 60 to openings 80, 81, 82, and 83, and into and through the volumes 180 of the respective bowls 55A, 55B, 55C, and 55D applied to receptacle 51 through the front openings 201 of the respective bowls 55A, 55B, 55C, and 55D. Diverter 52 is easily removable from receptacle 52 for cleaning, repair, or replacement, as are bowls 55A, 55B, 55C, and 55D. Diverters 54A, 54B, and 54C may each be applied to and between diverter 52 and receptacle 51 to isolate an opening formed in receptacle 51 and its corresponding channel 101 formed in diverter 52 from volume 60 of receptacle 51 to essentially plug the opening and the corresponding channel 101 from receiving pet food from volume 60 when so desired, and this allows receptacle assembly 51 to be used with a desired number of bowls for serving a desired number of pets. The top face 120 of each plug installed to and between diverter 52 and receptacle 51 faces upwardly into volume 60 toward main opening 68, inclines downwardly from inner surface 64 of sidewall 61 toward any unoccupied channel 101 of diverter and is operative for receiving and conveying pet food to such unoccupied channel 101, and top faces 120 and adjacently installed plugs relate and are substantially contiguous. Lids 205 of bowls 55A, 55B, 55C, and 55D area easily opened as previously explained for gaining access to pet food applied to bowls 55A, 55B, 55C, and 55D, and as the pet food in bowls 55A, 55B, 55C, and 55D is depleted, it will be refilled or replenished by gravity flow of the material into volume 180s of bowls 55A, 55B, 55C, and 55D from volume 60 of receptacle 51 as described. Although receptacle assembly 51 is particular useful in managing pet food, it may be used with any material as may be desired. Furthermore, receptacle assembly 51 incorporates four channels 101 in diverter 52, four openings 80, 81, 82, and 83 in receptacle 51, four corresponding bowls 55A, 55B, 55C, and 55D, and three plugs 54A, 54B, and 54C, and it will be understood that any other selected plurality of each may be incorporated into a receptacle assembly 51 constructed and arranged in accordance with the principle of the invention without departing from the invention.

The invention has been described above with reference to a preferred embodiment. Those skilled in the art will recognize that changes and modifications may be made to the embodiment without departing from the nature and scope of the invention. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A receptacle assembly, comprising:
   a receptacle includes a volume defined by a continuous sidewall extending between a bottom and an opposed top;
   openings formed in the continuous sidewall proximate to the bottom communicating with the volume;
   inclined channels removably positioned in the volume of the receptacle proximate to the bottom for receiving and conveying material from the volume to the respective openings;
   a plug located in the volume and applied to a first one of the inclined channels isolating from the volume a first one of the openings relating to the first one of the inclined channels; and
   the plug formed with an inclined surface for receiving and conveying material from the volume to a second one of the inclined channels adjacent to the first one of the inclined channels.

2. A receptacle assembly according to claim 1, further comprising bowls each engagable to the receptacle in communication with one of the openings formed in the continuous sidewall.

3. A receptacle assembly according to claim 1, wherein the top further comprises an open top.

4. A receptacle assembly according to claim 3, further comprising a lid mounted to the receptacle for movement between a first position opening the open top, and a second position closing the open top.

5. A receptacle assembly, comprising:
   a receptacle includes a continuous sidewall extending between a bottom and an opposed top;
   a diverter formed with inclined channels, the diverter removably positioned in the bottom of the receptacle opposite to the top;
   a volume defined by the continuous sidewall between the inclined channels of the diverter and the top;
   an opening formed in the continuous sidewall opposite to each of the inclined channels;
   the inclined channels of the diverter for receiving and conveying material from the volume to the respective openings;
   a plug located in the volume and applied to a first one of the inclined channels of the diverter isolating from the volume the first one of the inclined channels and a first one of the openings relating to the first one of the inclined channels; and
   the plug formed with an inclined surface for receiving and conveying material from the volume to a second one of the inclined channels adjacent to the first one of the inclined channels.

6. A receptacle assembly according to claim 5, further comprising:
   the diverter includes a perimeter confronting the continuous sidewall; and
   an engagement pair formed between the continuous sidewall and the perimeter of the diverter preventing the inclined channels of the diverter from laterally displacing with respect to the openings formed in the receptacle, the engagement pair including an element carried by one of the receptacle and the perimeter of the diverter, and a complemental element carried by the other of the receptacle and the perimeter of the diverter.

7. A receptacle assembly according to claim 6, wherein the element of the engagement pair is a tongue, and the complemental element is a groove.

8. A receptacle assembly according to claim 5, wherein the plug is received in, and relates to, the first one of the inclined channels.

9. A receptacle assembly according to claim 5, further comprising bowls each engagable to the receptacle in communication with one of the openings formed in the continuous sidewall.

10. A receptacle assembly according to claim 5, further comprising:
the top includes a rim encircling a main opening into the volume at the top of the receptacle; and
a lid mounted to the receptacle for movement between a first position exposing the main opening to the volume, and a second position closing the main opening to the volume.

11. A receptacle assembly, comprising:
a receptacle includes a continuous sidewall extending between a bottom and an opposed top, the continuous sidewall having an inner surface and an opposed outer surface;
bowls applied directly to the receptacle proximate to the bottom, the bowls projecting outward from the outer surface of the continuous sidewall;
an integral diverter, formed with inclined channels, removably positioned in the bottom of the receptacle opposite to the top;
a volume defined by the inner surface of the continuous sidewall between the inclined channels of the diverter and the top;
an opening formed in the continuous sidewall between each of the inclined channels and one of the bowls;
the inclined channels of the diverter for receiving and conveying material from the volume to the bowls through the respective openings;
a plug applied to a first one of the inclined channels of the diverter isolating from the volume the first one of the inclined channels and a first one of the openings relating to the first one of the inclined channels; and
the plug formed with an inclined surface for receiving and conveying material from the volume to a second one of the inclined channels adjacent to the first one of the inclined channels.

12. A receptacle assembly according to claim 11, further comprising:
the diverter includes a perimeter confronting the continuous sidewall; and
a plurality of engagement pairs formed between the continuous sidewall and the perimeter of the diverter preventing the inclined channels of the diverter from laterally displacing with respect to the openings formed in the receptacle, the engagement pairs each including an element carried by one of the receptacle and the perimeter of the diverter, and a complemental element carried by the other of the receptacle and the perimeter of the diverter.

13. A receptacle assembly according to claim 12, wherein the element of the engagement pair is a tongue, and the complemental element is a groove.

14. A receptacle assembly according to claim 11, wherein the plug is received in, and relates to, the first one of the inclined channels.

* * * * *